US008294558B2

(12) United States Patent
Tsuruta et al.

(10) Patent No.: US 8,294,558 B2
(45) Date of Patent: Oct. 23, 2012

(54) STARTING CONTROL APPARATUS AND TUNER DEVICE

(75) Inventors: Norio Tsuruta, Hyogo (JP); Akira Takee, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 674 days.

(21) Appl. No.: 11/984,978

(22) Filed: Nov. 26, 2007

(65) Prior Publication Data

US 2008/0129473 A1    Jun. 5, 2008

(30) Foreign Application Priority Data

Dec. 4, 2006  (JP) ................................. 2006-327581
Oct. 5, 2007  (JP) ................................. 2007-262065

(51) Int. Cl.
*B60R 25/10* (2006.01)

(52) U.S. Cl. ......... 340/426.13; 340/426.14; 340/426.16; 340/426.3; 340/426.36; 307/9.1; 307/10.3

(58) Field of Classification Search ............ 340/426.13, 340/426.14, 426.25, 425.36, 825.72, 5.61, 340/426.16, 426.3, 426.36, 5.72, 7.1, 7.23, 340/13.2, 13.24; 307/10.1, 10.5, 9.1, 10.3, 307/10.6; 324/754, 380
See application file for complete search history.

(56) References Cited

U.S. PATENT DOCUMENTS

| | | | | |
|---|---|---|---|---|
| 5,952,937 A | * | 9/1999 | Koopman et al. | 340/825.72 |
| 6,100,792 A | * | 8/2000 | Ogino et al. | 340/426.25 |
| 6,580,181 B2 | * | 6/2003 | Nagoya et al. | 307/10.5 |
| 6,664,889 B2 | * | 12/2003 | Chang | 340/426.17 |
| 7,036,876 B2 | | 5/2006 | Senoo et al. | |
| 7,298,058 B2 | * | 11/2007 | Matsubara et al. | 307/10.5 |
| 7,315,237 B2 | | 1/2008 | Shimonomoto et al. | |
| 7,514,811 B2 | * | 4/2009 | Matsubara et al. | 307/10.5 |
| 2003/0214392 A1 | * | 11/2003 | Flick | 340/426.13 |
| 2005/0151630 A1 | * | 7/2005 | Shimonomoto et al. | 340/426.14 |
| 2006/0175900 A1 | * | 8/2006 | Ono et al. | 307/10.1 |
| 2006/0220806 A1 | * | 10/2006 | Nguyen | 340/426.36 |
| 2006/0232131 A1 | * | 10/2006 | Endo | 307/10.2 |
| 2007/0257769 A1 | * | 11/2007 | Matsubara et al. | 340/5.61 |

FOREIGN PATENT DOCUMENTS

| | | |
|---|---|---|
| CN | 1640734 A | 7/2005 |
| JP | A 08-247009 | 9/1996 |
| JP | A 10-009102 | 1/1998 |
| JP | A 10-211868 | 8/1998 |
| JP | A 11-198761 | 7/1999 |
| JP | A 11-230013 | 8/1999 |
| JP | A 2005-029119 | 2/2005 |
| JP | A 2005-180249 | 7/2005 |
| WO | WO 2006/075533 A1 | 7/2006 |

OTHER PUBLICATIONS

Sep. 22, 2011 Office Action issued in Chinese Patent Application No. 200710193329.4 (with English Translation).

* cited by examiner

*Primary Examiner* — George Bugg
*Assistant Examiner* — Sisay Yacob
(74) *Attorney, Agent, or Firm* — Oliff & Berridge, PLC

(57) ABSTRACT

A remote starting ECU includes a command recognizing unit and a tuner connecting unit. The remote starting ECU starts an engine of a vehicle when the command recognizing unit receives an engine start command from a remote key or when the tuner connecting unit receives an engine start request from a remote controller.

18 Claims, 6 Drawing Sheets

FIG.4

| DOOR IS OPEN |
|---|
| DOOR IS UNLOCKED |
| HOOD IS OPEN |
| SHIFT LEVER IS NOT IN PARKING POSITION |
| BRAKE IS APPLIED |
| CHECK ENGINE LAMP LIGHTS UP |
| TROUBLE IS DETECTED IN ENGINE REVOLUTIONS |
| TROUBLE IS DETECTED IN VEHICLE SPEED |

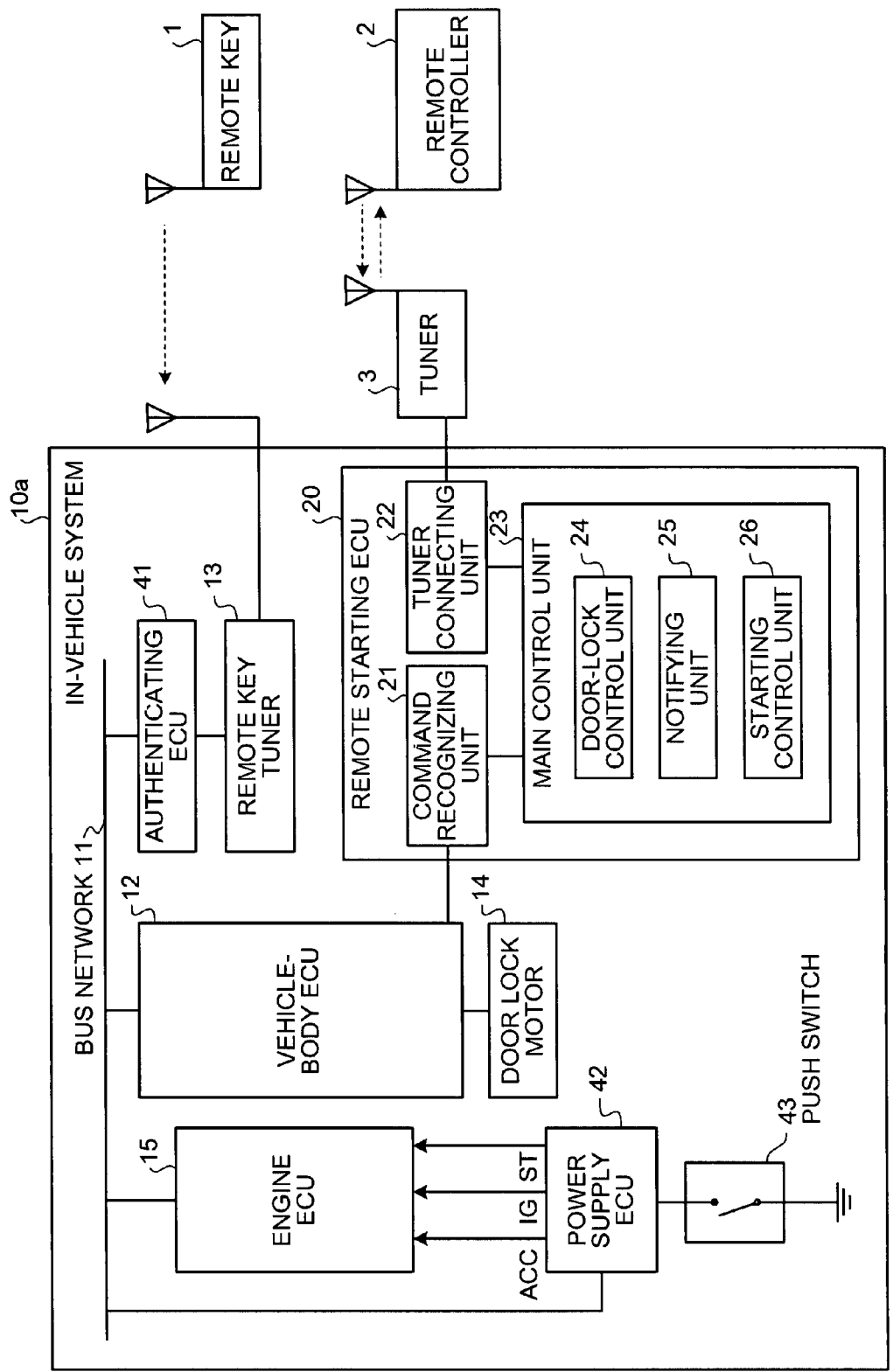

US 8,294,558 B2

STARTING CONTROL APPARATUS AND TUNER DEVICE

BACKGROUND OF THE INVENTION

1. Field of the Invention

The present invention relates to a technology for remotely starting an engine of a vehicle.

2. Description of the Related Art

A few years ago, when locking/unlocking the door of a vehicle or when starting the engine, a person would insert a key into a key cylinder and turn the key. These days, however, such operations can be performed remotely by using a remote key.

The functions of the remote key have been increasingly enhanced. For example, a technology for starting an engine of a vehicle remotely by using such a key has been developed.

Conventional technologies for starting an engine by remote control are disclosed in Japanese Patent Application Laid-Open Nos. H11-198761, H11-230013, H08-247009, H10-211868, 2005-180249, and 2005-29119. In those conventional technologies, a starting control device is installed in a vehicle, and when the starting control device receives an engine start request from an external device via wireless communication, the starting control device performs operation for starting an engine.

Two types of the starting control devices are know in the art. The first type receives an engine start request via wireless communication from a remote key. The second type receives the same request from a remote controller that is exclusively used for starting an engine instead of the remote key.

The remote key is mainly used to perform operation for locking or unlocking the door or for giving an alarm (panic alarm) to people around the vehicle. Therefore, in the first type, a predetermined command for performing engine start operation is necessary. Such a command can be sent from the remote key by pressing a button for a door lock request three times in series.

Because it is not necessary to provide a remote controller and, a tuner, the first type can be provided at lower costs.

However, the remote key is sometimes inconvenient; because, the communication range of the remote key is narrower (e.g., five meters away from a vehicle) than that of the remote controller.

Thus, there is a need for an improved starting control device.

SUMMARY OF THE INVENTION

It is an object of the present invention to at least partially solve the problems in the conventional technology.

According to an aspect of the present invention, there is provided a starting control apparatus that controls starting of an engine of a vehicle. The starting control apparatus includes a receiving unit configured to receive a first signal indicative of an engine start request from a remote key via wireless communication; a tuner connecting unit connectable to an external tuner that receives a second signal indicative of an engine start request from a remote controller via wireless communication, wherein the tuner connecting unit receives the second signal from the external tuner; and a starting control unit that starts the engine any one of when the receiving unit receives the first signal and when the tuner connecting unit receives the second signal.

According to another aspect of the present invention, there is provided a tuner device configured to be connected to a starting control apparatus that controls starting of an engine of a vehicle. The tuner device includes a first communication unit configured to be externally connected to a tuner connecting unit in the starting control apparatus so that the first communication unit communicates with the starting control apparatus; and a second communication unit that receives a signal from a remote controller via wireless communication. The first communication unit feeds a signal indicative of an engine start request to the starting control apparatus when the second communication unit receives a signal indicative of the engine start request from the remote controller.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table of examples of diagnostic information;

FIG. 6 is a schematic diagram of an electronic-type in-vehicle system including a starting control apparatus according to a second embodiment of the present invention.

DETAILED DESCRIPTION OF THE PREFERRED EMBODIMENTS

Exemplary embodiments of the present invention are described in detail below with reference to the accompanying drawings.

Two types of in-vehicle systems for starting an engine of a vehicle are known in the art: mechanical type and electronic type. In the mechanical type, a key is inserted into a key cylinder and the key is manually turned to start the engine. In the electronic type, which is also called a push-starting system, a button is operated to generate a signal to start the engine. The present invention can be applied to both the mechanical type and the electronic type. How the present invention can be applied to the mechanical type is explained with reference to FIGS. 1 to 5, and how it can be applied to the electronic type is explained with reference to FIG. 6.

Figure 1:
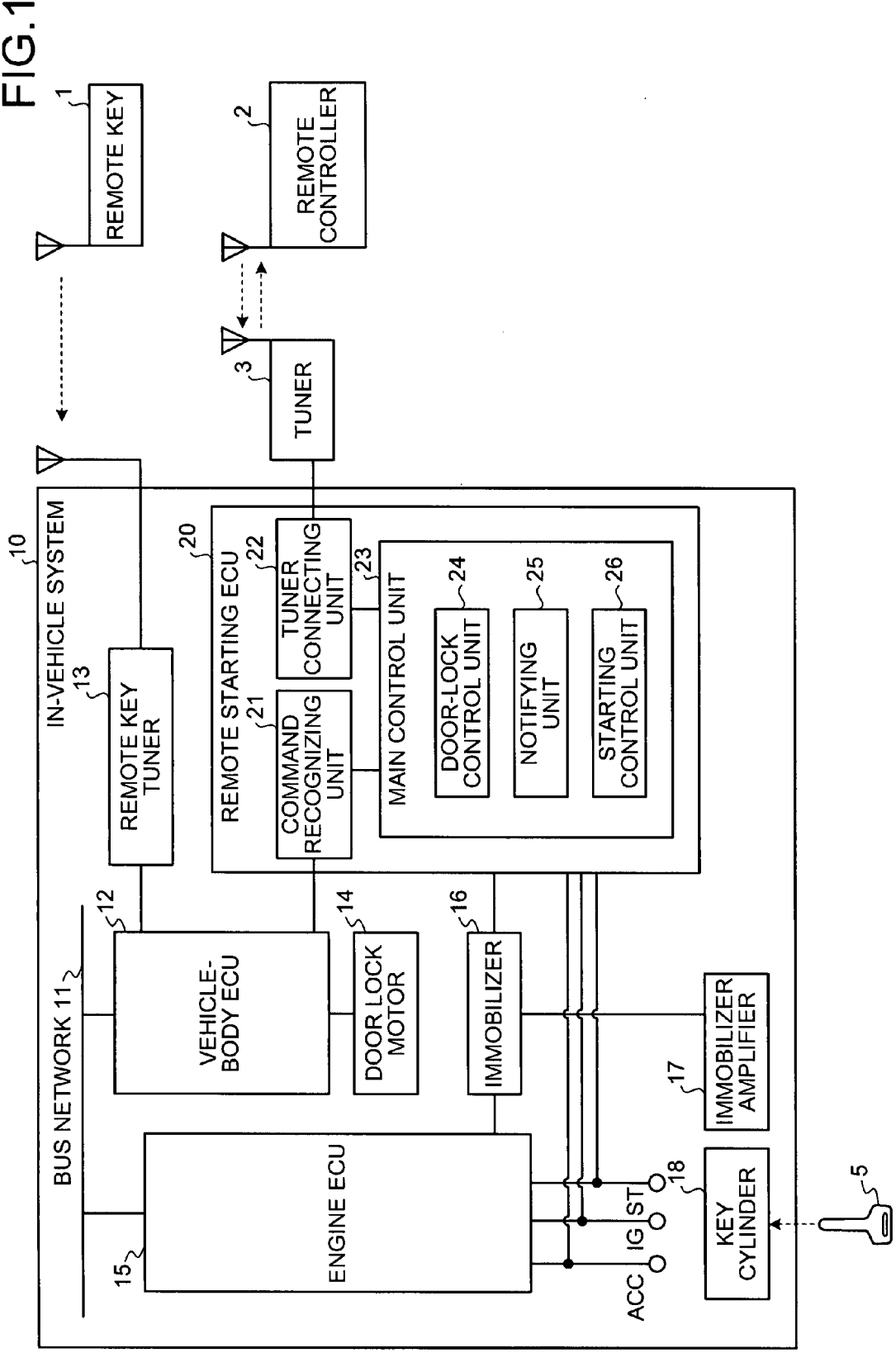
FIG. 1 is a schematic diagram of a mechanical-type in-vehicle system including a starting control apparatus according to a first embodiment of the present invention.

FIG. 1 is a schematic diagram of an in-vehicle system 10 including a starting control apparatus according to a first embodiment of the present invention. The in-vehicle system 10 is a mechanical type of system. The in-vehicle system 10 includes a vehicle-body electrical control unit (ECU) 12 and an engine ECU 15, which is an ECU for electronic fuel injection (EFi). The vehicle-body ECU 12 and the engine ECU 15 are connected to a bus network 11.

The vehicle-body ECU 12 is connected to a remote key tuner 13, a door lock motor 14, and a remote starting ECU 20. The engine ECU 15 and the remote starting ECU 20 are connected to an immobilizer 16.

An immobilizer amplifier 17 is connected to the immobilizer 16 and arranged near a key cylinder 18 into which a key 5 of a vehicle is inserted.

The engine ECU 15 controls the overall operations of an engine (not shown). More specifically, the engine ECU 15 starts operation in response to a connection with an ignition line (IG). When the engine ECU 15 detects that a starter motor (not shown) starts rotating in response to a connection with a starter line (ST), the engine ECU 15 performs fuel injection into the engine and ignition control to start and operate the engine. When the ignition line is released, the engine ECU 15 terminates fuel injection and stops the engine.

The engine ECU 15 acquires information on the states of the engine, such as engine speed, and uses that information to control the engine. The engine ECU 15 communicates with the vehicle-body ECU 12 via the bus network 11. The engine ECU 15 receives information output from the vehicle-body ECU 12, and transmits information to the vehicle-body ECU 12 via the bus network 11.

The immobilizer 16 is a device that prevents the vehicle from being stolen. Specifically, the key 5 is provided with a key code for authentication, and when the key 5 is inserted into the key cylinder 18, the immobilizer 16 performs authentication of the key by using the key code. If the key is not authentic, the immobilizer 16 inhibits the engine from starting. The immobilizer 16 cancels inhibition of engine start only when the key is authentic.

The procedure for canceling the inhibition of the engine start by the immobilizer 16 is described below. The key cylinder 18 detects insertion of the key 5 and notifies the immobilizer 16 of the insertion (process 1). When the immobilizer 16 receives the notification from the key cylinder 18, the immobilizer 16 requests the immobilizer amplifier 17 to send the key code of the key 5 (process 2). The immobilizer amplifier 17 communicates with the key 5 via wireless communication to read the key code stored in a transponder (not shown) built in the key 5, and transmits the key code to the immobilizer 16 (process 3). The immobilizer 16 determines whether the key code received from the immobilizer amplifier 17 is same to a key code previously stored in the immobilizer 16. When it is determined that the key codes are same, the immobilizer 16 determines that the key 5 is authentic and gives permission to the engine ECU 15 to start the engine, thereby canceling the inhibition of the engine start (process 4).

When a user inserts an authentic key 5 into the key cylinder 18, the immobilizer 16 automatically cancels the inhibition of the engine start. The user then turns the key 5 to operate the ignition line, the starter line, and an accessory line (ACC) that controls power supply to in-vehicle equipment, so that the starter motor is driven. By driving the starter motor, the engine ECU 15 is caused to control fuel injection and ignition to start the engine. On the other hand, if someone inserts a non-authentic key into the key cylinder 18, the engine ECU 15 is not allowed to start the engine because the key code received from the immobilizer amplifier 17 is not same as the key code stored in the immobilizer 16. In this case, even if the non-authentic key is turned to drive the starter motor, the engine ECU 15 is not operated, and therefore, the engine does not start.

The vehicle-body ECU 12 controls the states of the vehicle. More specifically, the vehicle-body ECU 12 controls operation of the door lock motor 14 to lock or unlock a door (not shown) of the vehicle. The vehicle-body ECU 12 is connected to the remote key tuner 13 and the bus network 11. The vehicle-body ECU 12 receives information input from the remote key tuner 13, outputs the information to the bus network 11, and communicates with the engine ECU 15 via the bus network 11.

The remote key tuner 13 communicates with a remote key 1 via an antenna. The remote key 1 is a remote control terminal to be operated by a user. The remote key 1 sends to the in-vehicle system 10 a request for locking or unlocking the door or for giving an alarm to the people around the vehicle. The key 5 and the remote key 1 can be two different keys or they can be integrated into one key.

The vehicle-body ECU 12 receives through the remote key tuner 13 a control request for the vehicle, such as a request for locking or unlocking the door or for giving the alarm. The vehicle-body ECU 12 then performs operation (locking or unlocking the door, or giving the alarm) in response to the received control request, and sends the control request to the remote starting ECU 20.

The remote starting ECU 20 performs operation to start the engine when the key 5 is not inserted into the key cylinder 18, i.e., the user is away from the vehicle. The remote starting ECU 20 stores therein an immobilizer code for authentication that has the same function as that of the key code stored in the key 5, so that the immobilizer 16 cancels the inhibition of the engine start based on the immobilizer code.

The remote starting ECU 20 includes a command recognizing unit 21, a tuner connecting unit 22, and a main control unit 23. The main control unit 23 includes a door-lock control unit 24, a notifying unit 25, and a starting control unit 26.

The command recognizing unit 21 receives control requests from the vehicle-body ECU 12 and determines whether the control requests define a command for a specific operation. For example, when a combination of requests, i.e., three requests for locking the door, are sent in series to the command recognizing unit 21 (a button for making the door lock request is pressed for a short period for the first and second times and for a long period for the third time), the command recognizing unit 21 recognizes the combination of three requests as a command for starting the engine. In this manner, a combination of control requests is recognized as a command for the specific operation, so that the remote key 1 can send not only a request for locking or unlocking the door or for giving an alarm, but also a request for other operations such as the engine start. The above-described command is an example, and the command can be changed as needed. In addition, a command can include a request for operation other than the engine start.

The tuner connecting unit 22 is externally connected to a tuner 3 that performs communication bi-directionally. The tuner connecting unit 22 includes a connector (not shown), to which a transmission cable is connected, and a transmission circuit (not shown) that delivers signals. The tuner 3 is physically connected to the remote starting ECU 20 with a transmission cable (not shown) such as a wiring harness, so that the tuner 3 and the remote starting ECU 20 communicate with each other bi-directionally. The transmission cable is coupled to the connector of the tuner connecting unit 22. A signal from the tuner 3 is input into the tuner connecting unit 22 through the connector and is transmitted to the main control unit 23 via the transmission circuit of the tuner connecting unit 22. The transmission circuit can be any circuit that has a function of transmitting a signal between the connector and the main control unit 23. Therefore, the tuner connecting unit 22 can have a simple configuration, making it possible to produce the tuner connecting unit 22 at relatively low cost. Furthermore, even when the remote starting ECU 20 includes the tuner connecting unit 22, the cost of the remote starting ECU 20 hardly increases.

The tuner 3 communicates with a remote controller 2 via wireless communication. The communication range of the remote controller 2 is wider than that of the remote key 1. When the tuner 3 receives a control request, such as an engine start request, from the remote controller 2, the tuner 3 inputs the received control request to the tuner connecting unit 22.

The tuner connecting unit 22 then inputs the control request to the main control unit 23. When the tuner 3 receives a request for transmitting information, such as a state of the vehicle, from the remote starting ECU 20 through the tuner connecting unit 22, the tuner 3 transmits the information to the remote controller 2.

Unlike the remote key 1, the remote controller 2 is a remote control terminal that is configured to, control the engine by remote operation. The remote controller 2 can be provided with an operation button that is exclusively used for transmitting an engine start request. In addition, the remote controller 2 can be configured to transmit a control signal that is exclusively assigned to an engine start request.

The remote starting ECU 20 causes the starting control unit 26 to control the engine start when an engine start request is received from the remote controller 2, and when an engine start command, which is defined by a combination of control requests, is transmitted from the remote key 1. Thus, the starting control unit 26 is shared by the remote key 1 and the remote controller 2 for the remote control of the engine start. The starting control unit 26 receives signals for a request from the remote key 1 and the remote controller 2. To ensure that signals are input from the remote key 1 and the remote controller 2, it is preferable that different communication protocols are used for the remote key 1 and the remote controller 2, respectively.

A procedure for starting the engine by the starting control unit 26 is described below. The starting control unit 26 recognizes an engine, start request from the remote key 1 or the remote controller 2 (process 1). In response to the engine start request, the starting control unit 26 requests the immobilizer 16 to cancel the inhibition of the engine start (process 2). In response to the cancellation request, the immobilizer 16 performs authentication to the immobilizer code stored in the remote starting ECU 20. If it is determined that the immobilizer code is authentic, the immobilizer 16 gives permission to the engine ECU 15 to start the engine, and notifies the remote starting ECU 20 of the cancellation of the inhibition of the engine start (process 3). The remote starting ECU 20 then operates the accessory line, the ignition line, and the starter line to output false signals from each of the lines, thereby starting the engine (process 4).

The remote controller 2 can be configured to send, in addition to the engine start request, control requests for the vehicle such as a request for locking or unlocking the door or giving an alarm. For example, when the remote controller 2 sends a request for locking or unlocking the door, the door-lock control unit 24 receives the request, and requests the vehicle-body ECU 12 to lock or unlock the door. When the remote controller 2 sends a request for giving an alarm, the main control unit 23 receives the request, and requests the vehicle-body ECU 12 to give an alarm.

When the vehicle-body ECU 12 receives a control request from the remote starting ECU 20, the vehicle-body ECU 12 controls operation, e.g., controls operation of the door lock motor 14, in the same manner as when the vehicle-body ECU 12 receives a control request from the remote key tuner 13. The vehicle-body ECU 12 notifies the remote starting ECU 20 of a control request received from the remote key tuner 13. However, it is preferable that the vehicle-body ECU 12 does not notify the remote starting ECU 20 of a control request received from the remote starting ECU 20.

Furthermore, the remote starting ECU 20 can notify the remote controller 2 of information on the vehicle. The notifying unit 25 transmits a signal indicative of the information to the tuner 3 through the tuner connecting unit 22 and the transmission cable, and the tuner 3 transmits the signal to the remote controller 2 via wireless communication. The information to be notified includes some information on the vehicle, such as a result of control by the starting control unit 26 or the door-lock control unit 24, states of the vehicle, or diagnostic information.

When the engine is started in response to a request from the remote controller 2, the remote starting ECU 20 notifies the remote controller 2 of a control result. When the engine is started in response to a command from the remote key 1, the remote starting ECU 20 does not notify the remote key 1 of a control result because the remote key 1 does not have a function of receiving information. Therefore, the remote starting ECU can be configured such that the control result in accordance with the command from the remote key 1 is transmitted to the remote controller 2.

Figure 2:
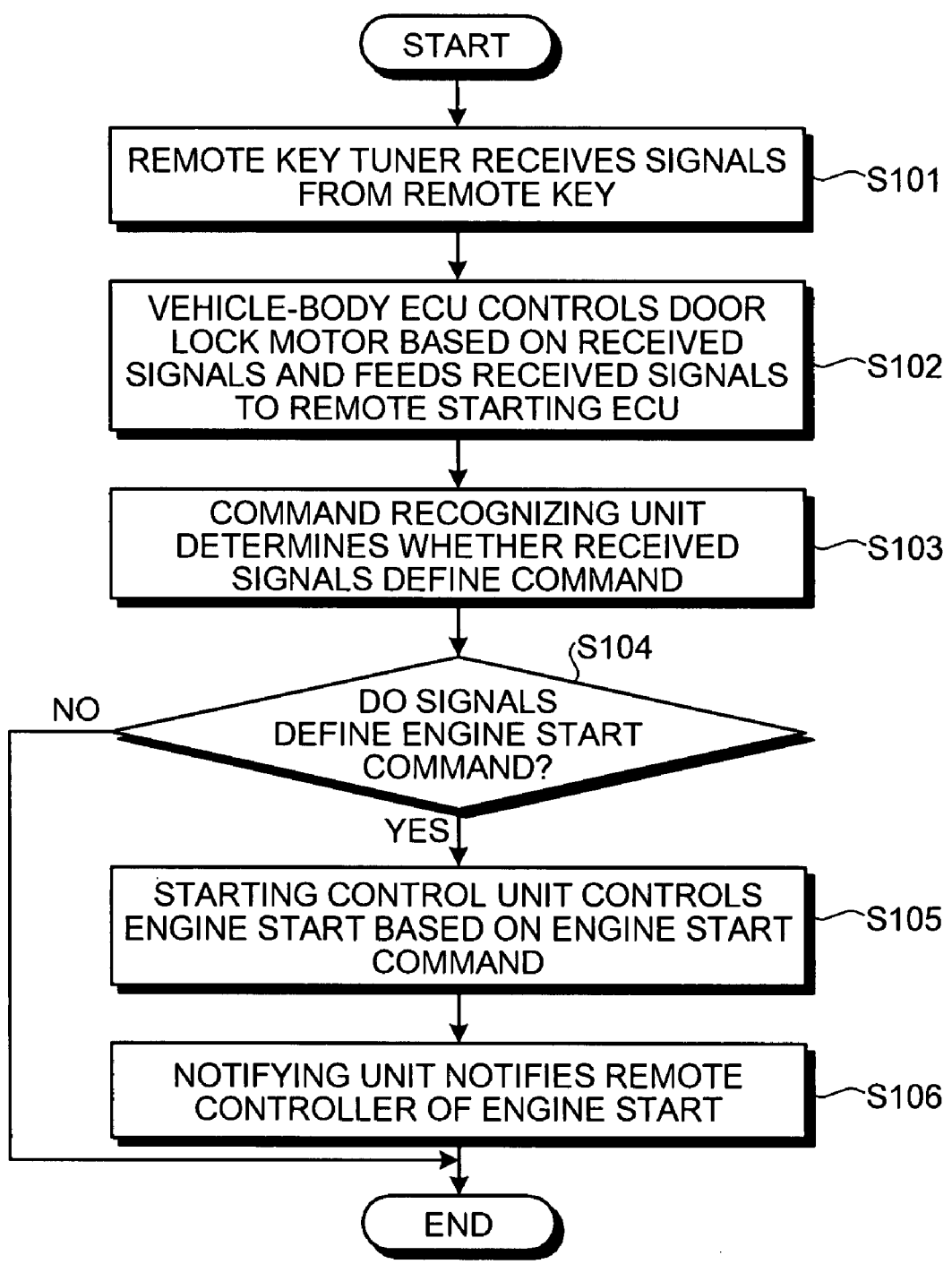
FIG. 2 is a flowchart of a starting control operation by using a remote key shown in FIG. 1.

FIG. 2 is a flowchart of a starting control operation by using a remote key. The remote key tuner 13 receives signals from the remote key 1 (step S101). The vehicle-body ECU 12 controls the door lock motor 14 based on the received signals, and feeds the signals to the remote starting ECU 20 (step S102).

The command recognizing unit 21 in the remote starting ECU 20 determines whether the received signals define a command (step S103). If the signals do not define a command (No at step S104), the process terminates.

If the signals define an engine start command (Yes at step S104), the starting control unit 26 controls the engine start based on the engine start command (step S105). The notifying unit 25 then notifies the remote controller 2 of the engine start (step S106), and the process terminates. An operation for locking or unlocking of a door can be performed in a similar manner.

Figure 3:
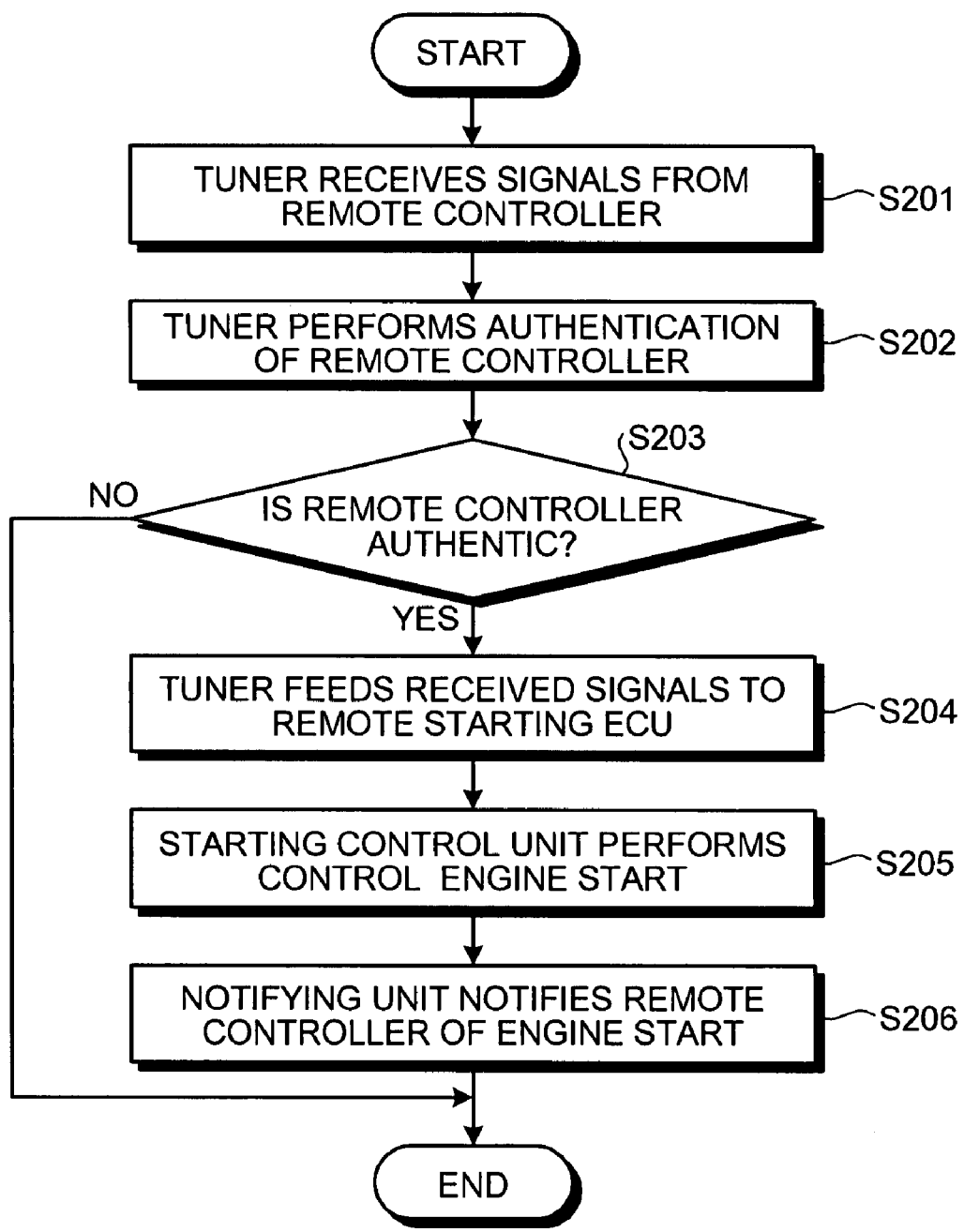
FIG. 3 is a flowchart of a starting control operation by using a remote controller shown in FIG. 1.

FIG. 3 is a flowchart of a starting control operation by using the remote controller 2. The tuner 3 receives signals from the remote controller 2 (step S201). The tuner 3 performs authentication to check whether the signals are transmitted from an authentic remote controller (step S202). The tuner 3 performs the authentication by determining whether a code contained in the signals received from the remote controller 2 is same as a code previously stored in the tuner 3.

When it is determined that the remote controller 2 is not authentic (No at step S203), the process terminates.

When it is determined that the remote controller 2 is authentic (Yes at step S203), the tuner 3 feeds the signals to the remote starting ECU 20 via the tuner connecting unit 22 (step S204).

The staring control unit 26 in the remote starting ECU 20 performs control engine start based on the received signals (step S205). The notifying unit 25 then notifies the remote controller 2 of the engine start (step S206), and the process terminates. An operation for locking or unlocking of a door can be performed in a similar manner.

The tuner 3 and the remote controller 2 can be installed in the in-vehicle system 10 instead of installing them outside the in-vehicle system 10.

Moreover, the tuner 3 is not necessarily connected to the tuner connecting unit 22. When the tuner 3 is not connected to the tuner connecting unit 22, the engine can be started by the remote key 1. When the tuner 3 is connected to the tuner connecting unit 22, the engine can be started by the remote controller 2 over a wider range than by the remote key 1.

Thus, it is possible to control the engine start when the tuner 3 is connected to the tuner connecting unit 22 as well as when the tuner 3 is not connected to the tuner connecting unit 22. Furthermore, the remote starting ECU 20 performs operation in the same manner with or without the tuner 3 connected to the tuner connecting unit 22.

It is possible to reduce costs of the in-vehicle system 10 by not having the tuner 3 connected to the tuner connecting unit 22 as default specification. That is, if required, a user can connect the tuner 3 to the tuner connecting unit 22 at a later stage in a simple manner.

It is explained in the embodiment that the tuner 3 performs authentication of the remote controller 2. Alternatively, it is possible to configure the remote starting ECU 20 to perform the authentication.

Functions of the in-vehicle system 10 can be improved when the tuner 3 is connected to the tuner connecting unit 22. For example, the engine can be started by the remote controller 2 over a wider range than by the remote key 1, and the user can be provided with information from the tuner 3. The information to be supplied to the user includes a result of remote control and a current state of the vehicle. Specifically, the current state of the vehicle includes an operation state of the engine, an open/close condition of doors or windows, room temperature, presence or absence of an abnormal state, or the like. Moreover, the user can be notified of diagnostic information such as a record of abnormal engine stop.

FIG. 4 is a table of examples of diagnostic information indicative of causes for the engine stop. The engine of the vehicle is not started by remote control or the engine is stopped when the engine is in operation due to one of the following causes: the door is open or unlocked; the hood covering of the engine room is open; the shift lever is not in the parking position; the brake is applied; the check engine lamp lights up; a trouble is detected in engine revolutions; and a trouble is detected in the vehicle speed.

The remote starting ECU 20 stores therein the record of the engine stop, and the remote starting ECU 20 transmits the record to the remote controller 2 in response to a request received from the remote controller 2.

The diagnostic information stored in the remote starting ECU 20 is described as an example in the embodiment. However, diagnostic information, other than information on the engine start, stored in the other ECUs can be transmitted to the remote controller 2.

Figure 5:
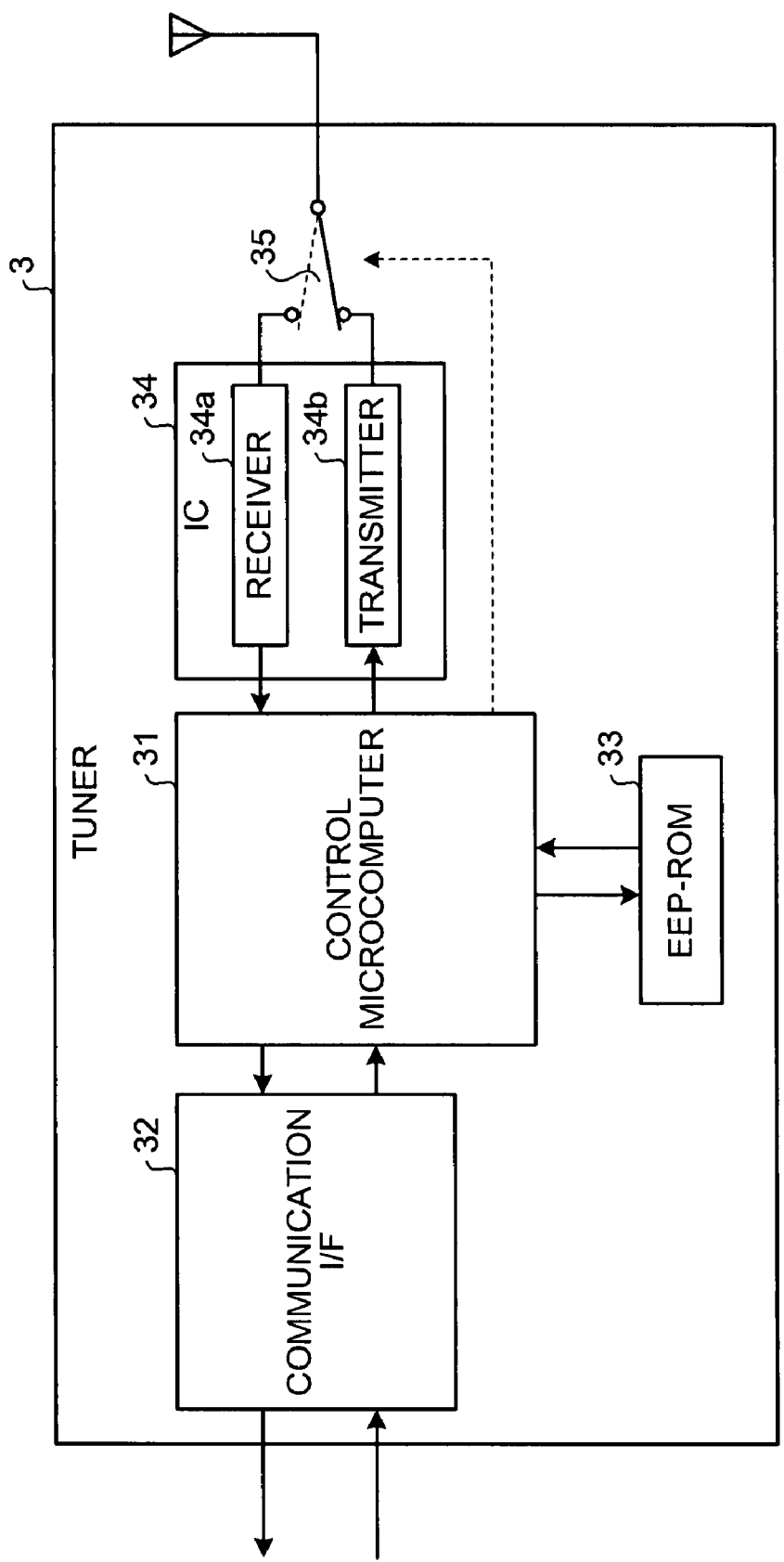
FIG. 5 is a schematic diagram of a tuner shown in FIG. 1.

FIG. 5 is a schematic diagram of the tuner 3. The tuner 3 includes a control microcomputer 31, a communication interface (I/F) 32, an electronically erasable and programmable read only memory (EEP-ROM) 33, a receiver 34a, a transmitter 34b, and a switch 35.

The control microcomputer 31 controls the tuner 3, and has a function of performing authentication to the remote controller 2 that transmits a signal to the tuner 3. The communication I/F 32 transmits/receives data to/from the remote starting ECU 20. The communication I/F 32 is physically and externally connected to the tuner connecting unit 22 in the remote starting ECU 20 via a transmission cable, so that the tuner 3 and the remote starting ECU 20 can communicate with each other bi-directionally. More specifically, the tuner 3 transmits a signal indicative of a control request, such as an engine start request, to the remote starting ECU 20 through the transmission cable. On the other hand, the remote starting ECU 20 transmits a signal indicative of a result of control based on a control request or other information on the vehicle to the tuner 3 through the transmission cable. One transmission cable can be used for the bi-directional communication. Alternatively, the bi-directional communication can be performed by using a plurality of transmission paths. The EEP-ROM 33 is a storage area in which an authentication code or the like is stored.

The receiver 34a and the transmitter 34b are constructed by an integrated circuit (IC) 34. The receiver 34a receives signals from the remote controller 2, and the transmitter 34b transmits signals to the remote controller 2.

The switch 35 is selectively connected to the receiver 34a for receiving operation and the transmitter 34b for transmitting operation by a control signal from the control microcomputer 31.

FIG. 6 is a schematic diagram of an in-vehicle system 10a including a starting control apparatus according to a second embodiment of the present invention. The in-vehicle system 10a is an electronic-type of system. The in-vehicle system 10a includes the vehicle-body ECU 12, the engine ECU 15, an authenticating ECU 41, and a power supply ECU 42, which are connected to the bus network 11.

The vehicle-body ECU 12 is connected to the door lock motor 14 and the remote starting ECU 20. The remote key tuner 13 is connected to the authenticating ECU 41.

The remote key tuner 13 is connected to a plurality of antennas, although one antenna is shown in FIG. 6. Some of the antennas are arranged inside the vehicle and the others outside the vehicle. The remote key tuner 13 communicates with the remote key 1, and outputs a signal received from the remote key 1 and information indicative of which antenna of the remote key tuner 13 has received the signal.

The authenticating ECU 41 has the function of the immobilizer 16 shown in FIG. 1. The authenticating ECU 41 determines whether the remote key 1 is operated from inside or outside of the vehicle based on an output signal from the remote key tuner 13, i.e., based on which antenna has received the signal from the remote key 1. Furthermore, the authenticating ECU 41 performs operation to inhibit the engine from starting or cancel the inhibition of the engine start. The authenticating ECU 41 performs authentication to check whether the remote key 1 is authentic based on a key code stored in the remote key 1.

The power supply ECU 42 controls starting of the engine ECU 15. The power supply ECU 42 is connected to a push switch 43, which performs operation for starting the engine as a substitute for the key 5. Furthermore, the power supply ECU 42 is connected to the engine ECU 15 to control the ACC, the IG, and the ST.

The procedure for starting the engine by using the push switch 43 is described below. When the remote key tuner 13 communicates with the remote key 1 and the authenticating ECU 41 determines that the remote key 1 is operated from inside the vehicle, the authenticating ECU 41 performs authentication of the remote key 1 (process 1). When it is determined that the remote key 1 is authentic, the authenticating ECU 41 gives permission to the engine ECU 15 to start the engine, thereby canceling the inhibition of the engine start (process 2). When the user operates the push switch 43, the power supply ECU 42 controls the ACC, the IG, and the ST to start the engine (process 3).

The remote starting ECU 20 in the in-vehicle system 10a has the same configuration and is operated in the same manner as the remote starting ECU 20 in the in-vehicle system 10 shown in FIG. 1. Thus, it is possible to reduce costs of the in-vehicle system 10a by not having the tuner 3 connected to the tuner connecting unit 22 as default specification. Furthermore, it is possible to start the engine by using the remote key 1. If required, the user can connect the tuner 3 to the tuner connecting unit 22 at a later stage to improve the in-vehicle system 10.

As described above, in the in-vehicle systems according to the embodiments, the remote starting ECU 20 includes the command recognizing unit 21 and the tuner connecting unit 22. Thus, the remote starting ECU 20 controls the engine start in the same manner when the remote starting ECU 20 receives a command for the engine start from the remote key 1 or when the remote starting ECU 20 receives an engine start request from the remote controller 2. It is possible to reduce costs of the in-vehicle system by not having the tuner 3 connected to the tuner connecting unit 22 at initial setting, and a user can additionally connect the tuner 3 to the tuner connecting unit 22 to improve the in-vehicle system as appropriate.

Although the communication between the remote controller 2 and the tuner 3 is bi-directional in the embodiments, the communication between them can be unidirectional in the direction from the remote controller 2 to the tuner 3.

According to an aspect of the present invention, the engine can be controlled by using the remote key and the remote controller.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A starting control apparatus that controls starting of an engine of a vehicle, the starting control apparatus comprising:
   a receiving unit configured to receive a first signal indicative of an engine start request from a remote key via wireless communication while the remote key is outside the vehicle;
   a tuner connecting unit connectable to an external tuner that receives a second signal indicative of an engine start request from a remote controller via wireless communication, wherein the tuner connecting unit receives the second signal from the external tuner; and
   a starting control unit that starts the engine in each of the following conditions:
   (i) when the receiving unit receives the first signal while the external tuner is not connected to the tuner connecting unit so as to disable communication between the external tuner and the tuner connecting unit,
   (ii) when the receiving unit receives the first signal while the remote key is not inserted into a key cylinder and the external tuner is connected to the tuner connecting unit, and
   (iii) when the tuner connecting unit receives the second signal while the remote key is not inserted into the key cylinder and the external tuner is connected to the tuner connecting unit.

2. The starting control apparatus according to claim 1, wherein the remote controller has a wider communication range than a communication range of the remote key.

3. The starting control apparatus according to claim 1, wherein
   the first signal indicates a predetermined combination of control requests, and
   the receiving unit comprises a recognizing unit that recognizes the predetermined combination as one of the engine start requests.

4. The starting control apparatus according to claim 3, further comprising a communication unit that communicates with a vehicle body control apparatus that controls a vehicle body in response to the first signal.

5. The starting control apparatus according to claim 4, wherein the receiving unit receives the first signal from the remote key via the vehicle body control apparatus.

6. The starting control apparatus according to claim 4, wherein the control requests comprise one of a request for locking a door of a vehicle, a request for unlocking a door of a vehicle, and a request for sounding an alarm to people around the vehicle.

7. The starting control apparatus according to claim 1, wherein the remote controller transmits a third signal indicative of a control request other than the engine start requests, and
   the starting control apparatus further comprises a vehicle control unit that receives the third signal from the external tuner through the tuner connecting unit, and controls a device installed in the vehicle based on the control request.

8. The starting control apparatus according to claim 7, wherein the control request other than the engine start requests comprises one of a request for locking a door of a vehicle, a request for unlocking a door of a vehicle, and a request for sounding an alarm to people around the vehicle.

9. The starting control apparatus according to claim 1, wherein communication between the external tuner and the remote controller is bi-directional, and
   the starting control apparatus further comprises a notifying unit that notifies the remote controller of information through the external tuner.

10. The starting control apparatus according to claim 9, wherein the notifying unit notifies the remote controller of vehicle information for the vehicle.

11. The starting control apparatus according to claim 9, wherein the notifying unit notifies the remote controller of a result of control based on a signal indicative of a request from the remote controller.

12. A starting control apparatus that controls starting of an engine of a vehicle, the starting control apparatus comprising:
    a receiving unit configured to receive a first signal indicative of an engine start request from a remote key via wireless communication while the remote key is outside the vehicle;
    a tuner connecting unit connectable to an external tuner that receives a second signal indicative of an engine start request from a remote controller via wireless communication, wherein the tuner connecting unit receives the second signal from the external tuner;
    a starting control unit that starts the engine in each of the following conditions: (i) when the receiving unit receives the first signal while the remote key is not inserted into a key cylinder and (ii) when the tuner connecting unit receives the second signal while the remote key is not inserted into the key cylinder; and
    a tuner device configured to be connected to the tuner connecting unit, the tuner device including:
       a first communication unit configured to be externally connected to the tuner connecting unit so as to communicate with the tuner connecting unit; and
       a second communication unit that receives a signal from the remote controller via wireless communication, the first communication unit being physically distinct from the second communication unit, wherein
       the first communication unit feeds a signal indicative of the engine start request from the remote controller to the tuner connecting unit when the second communication unit receives a signal indicative of the engine start request from the remote controller.

13. The in-vehicle system according to claim 12, wherein the tuner device further comprises an authenticating unit that performs authentication of the remote controller when the second communication unit receives the signal indicative of the engine start request from the remote controller, wherein the first communication unit feeds the engine start request from the remote controller to the tuner connecting unit when the remote controller is determined to be authentic by the authenticating unit.

14. The in-vehicle system according to claim 12, wherein communication between the second communication unit and the remote controller is bi-directional.

15. The in-vehicle system according to claim 14, wherein
the first communication unit acquires information on the vehicle from the tuner connecting unit, and
the second communication unit notifies the remote controller of the information acquired by the first communication unit.

16. The in-vehicle system according to claim 15, wherein the information acquired from the tuner connecting unit comprises a result of control by the starting control apparatus based on a signal indicative of a request from the remote controller.

17. The starting control apparatus according to claim 1, wherein the tuner connecting unit is connectable to the external tuner via a transmission cable.

18. The starting control apparatus according to claim 1, wherein the communication range of the remote controller is wider than the communication range of the remote key.

* * * * *